United States Patent [19]

Atsushi

[11] Patent Number: 4,988,648
[45] Date of Patent: * Jan. 29, 1991

[54] HOMOGENEOUS SOLID SOLUTION MATERIAL AND METHOD OF MANUFACTURING THE SAME

[75] Inventor: Ogura Atsushi, Kamakura, Japan

[73] Assignee: Okura Techno-Research Kabushiki Kaisha, Tokyo, Japan

[ * ] Notice: The portion of the term of this patent subsequent to Aug. 28, 2007 has been disclaimed.

[21] Appl. No.: 259,400

[22] Filed: Oct. 18, 1988

Related U.S. Application Data

[63] Continuation of Ser. No. 930,333, Nov. 12, 1986, abandoned.

[30] Foreign Application Priority Data

Nov. 29, 1985 [JP] Japan ............................ 60-267199
Jun. 13, 1986 [JP] Japan ............................ 61-136162

[51] Int. Cl.⁵ ...................... C04B 35/26; C04B 35/40
[52] U.S. Cl. .................... 501/126; 501/103; 428/329
[58] Field of Search ............... 428/323, 325, 329, 901; 501/103, 126

[56] References Cited

U.S. PATENT DOCUMENTS

| | | | |
|---|---|---|---|
| 3,044,867 | 7/1962 | Edström | 75/235 |
| 4,015,042 | 3/1977 | Chassaigne | 428/325 |
| 4,160,719 | 7/1979 | Pollock | 75/235 |
| 4,238,341 | 12/1980 | Kato et al. | 252/62.54 |
| 4,447,501 | 5/1984 | Shigeru et al. | 428/570 |
| 4,491,619 | 1/1985 | Biermann et al. | 428/403 |
| 4,629,653 | 12/1986 | Asai et al. | 428/328 |
| 4,726,991 | 2/1988 | Hyatt et al. | 428/329 |
| 4,820,581 | 4/1989 | Saito et al. | 428/323 |

Primary Examiner—Willaim R. Dixon, Jr.
Assistant Examiner—Chris Gallo
Attorney, Agent, or Firm—Darby & Darby

[57] ABSTRACT

A ferrite-ceramic composite powder consisting of fine particles of a ceramic material having a ferrite coating firmly bonded to the surface thereof is molten at high temperature and then cooled to produce a material in the form of a solid solution in which the ferrite component and the ceramic component are substantially homogeneously mixed together. Also, the ferrite-ceramic composite powder is mixed with fine particles of a second ceramic material and/or particles of a metal, and the mixture is baked to produce a sintered material.

8 Claims, 2 Drawing Sheets

F I G. 3
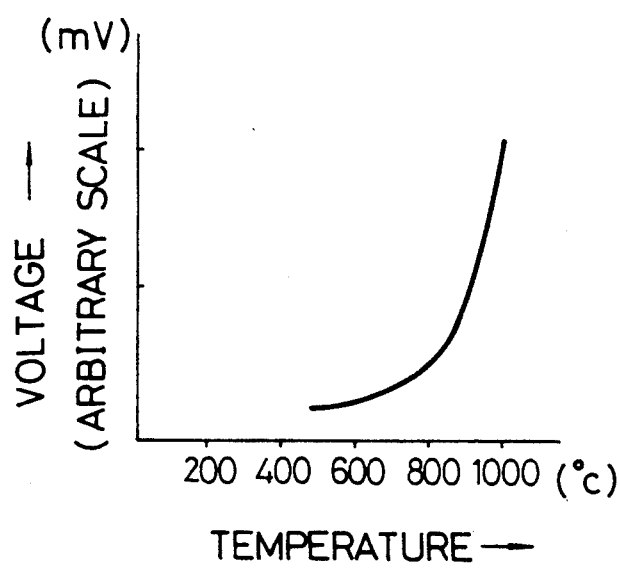

HOMOGENEOUS SOLID SOLUTION MATERIAL AND METHOD OF MANUFACTURING THE SAME

This is a continuation of application Ser. No. 930,333, filed Nov. 12, 1986 now abandoned.

BACKGROUND OF THE INVENTION

1. Field of the Invention

This invention relates to a homogeneous solid solution consisting of at least a ceramic component and a ferrite component compounded together and relates also to a method of manufacturing the same.

2. Description of the Prior Art

It is generally difficult to manufacture a composite having a uniform and homogeneous microstructure even when a mixture of fine particles of a plurality of kinds of inorganic powder materials is sintered or molten after being thoroughly kneaded. That is, in order to obtain a composite in the form of a homogeneous solid solution of a plurality of kinds of components, it is necessary to thoroughly homogeneously mix fine particles of those components. However, it is physically difficult to thoroughly homogeneously mix such components. Further, due to the differences of the melting points of those components, separation of one of the components having a higher melting point from another having a lower melting point occurs inevitably. Thus, it is very difficult to manufacture a composite having a thoroughly homogeneous microstructure which can satisfy the designed physical properties and functional requirements.

In an effort to solve such a problem, researches and studies have been made to manufacture a composite by baking a mixture of super-fine particles of a plurality of kinds of components having a fine particle size in the order of the angstrom unit. In spite of such an effort, satisfactory results have not been attained yet.

Thus, a material including a ceramic component and a metal component thoroughly homogeneously compounded together has not existed up to now. Even if such a material were present, its physical properties could only be estimated from those of the individual components before being mixed.

SUMMARY OF THE INVENTION

With a view to solve the prior art problems pointed out above, it is an object of the present invention to provide a novel material in the form of a thoroughly homogeneous solid solution consisting of at least a ceramic component and a ferrite component and a method of manufacturing the same.

Another object of the present invention is to provide a material comprising a metal component additionally homogeneously compounded with the ceramic component and the ferrite component described above.

The composite according to the present invention is in the form of a solid solution provided by melting and cooling a ferrite-ceramic composite powder consisting of fine particles of a ceramic material having a ferrite coating firmly bonded to the surface thereof.

In an embodiment of the present invention, this material is manufactured by melting a ferrite-ceramic composite powder, consisting of fine particles of a ceramic material having a ferrite coating firmly bonded to the surface thereof as described above, in a high-temperature furnace thereby turning the powder into a solid solution consisting of a ferrite component and a ceramic component.

In another embodiment of the present invention, the material is manufactured by melting a ferrite-ceramic composite powder, consisting of fine particles of a ceramic material having a ferrite coating firmly bonded to the surface thereof as described above, at a high temperature and spraying the melt onto an article to be coated thereby coating the article with a solid solution consisting of a ferrite component and a ceramic component.

The material thus obtained is in the form of a homogeneous solid solution of the ferrite and ceramic components. Therefore, the material provides an electrical insulator or a semiconductor having an excellent heat resistivity and a high mechanical rigidity and can find many applications as a material of various industrial products. For example, the composite according to the present invention can be used as a material of electrical and electronic parts exhibiting excellent functional characteristics, such as, heat generating elements, thermistors, varistors, dielectric elements, pyroelectric elements, piezoelectric elements, photoelectric elements, photomagnetic elements and the like.

According to still another embodiment of the present invention, the composite is manufactured by sintering fine particles of a second ceramic material and/or particles of a metal together with a ferrite-ceramic composite powder consisting of fine particles of a first ceramic material having a ferrite coating firmly bonded to the surface thereof.

This sintered composite according to the present invention is obtained by mixing the ferrite-ceramic composite powder with the second fine ceramic particles and/or the metal particles, adding water and/or a binder to the mixture and kneading the mixture to turn it into a sludge, charging the sludge into a mold which is under vibration, heating the sludge in the mold to vaporize the water therefrom, imparting pressure by a pressure plate to the sludge charged in the vibrating mold, heating the sludge again to shape it into a molded block, separating the molded block from the mold, and baking the molded block at a high temperature.

Fine ceramic particles preferably used in the present invention include those of oxides containing a metallic element or a semimetallic element, such as zirconia ($ZrO_2$), zircon ($ZrSiO_4$), silicon dioxide ($SiO_2$), alumina ($Al_2O_3$), cobalt oxide, titanium oxide and boron oxide. Also, fine particles and compounds such as those of nitrides including silicon nitride, those of carbides including silicon carbide and those of various mixtures of the aforementioned materials may be used. Further, the ferrite bonded to the surface of such fine ceramic particles includes preferably an oxide containing a metallic element such as nickel, cobalt, barium or titanium or an oxide containing a semimetallic element.

In the composite thus obtained, its components are homogeneously compounded together. The composite is physically excellent in its mechanical properties, corrosion resistivity and heat resistivity and is functionally excellent in its magnetic characteristics, electrical characteristics, etc. Therefore, the composite can find a variety of industrial applications as a material of various electronic members and various mechanical members.

The ferrite-ceramic composite powder described above was invented by the inventor of the present application and is disclosed in a co-pending patent application. Briefly describing, the ferrite-ceramic composite powder is manufactured by the steps of bringing an aqueous solution of ferric chloride into contact with many pieces or pellets of iron in the presence of a magnetic field to turn the ferric chloride solution into an aqueous solution of a complex salt, mixing this complex salt solution with an aqueous solution of ferric chloride containing many fine particles of a ceramic material and agitating the mixture to obtain a composite aqueous solution, mixing an aqueous solution of caustic soda with the composite aqueous solution and agitating the mixture to cause substantially uniform deposition of dark brown ferrite crystals on the surface of the fine ceramic particles, rinsing the fine ceramic particles covered with the ferrite to remove remaining dilute salt water, and drying the ferrite-ceramic composite particles.

Other objects and features of the present invention will become apparent from the following detailed description.

BRIEF DESCRIPTION OF THE DRAWINGS

FIG. 3 is a trend curve showing the relation between the heating temperature and the electromotive force of the semiconductor block shown in FIG. 2.

DESCRIPTION OF THE PREFERRED EMBODIMENTS

(1) Ferrite-ceramic composite powder

Figure 1:
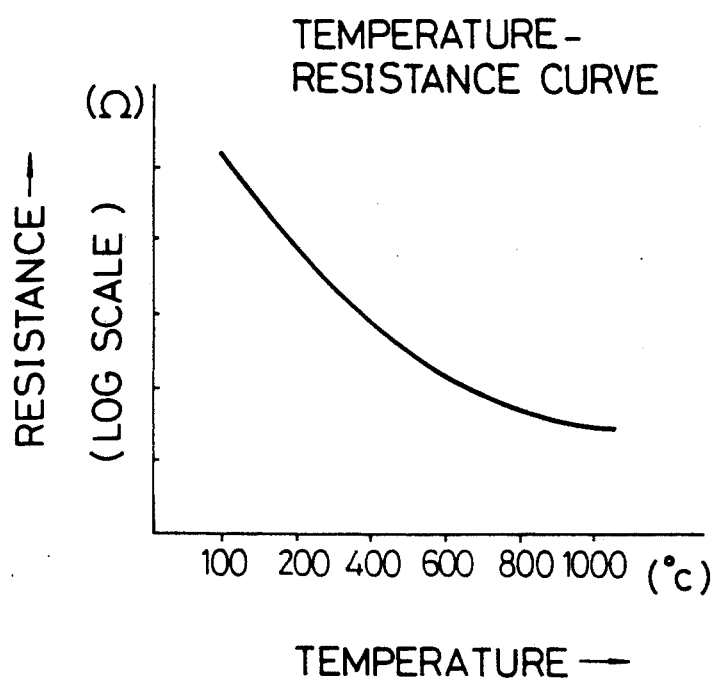
FIG. 1 is a trend curve showing the relation between the heating temperature and the resistance of a semiconductor provided by an embodiment of the composite according to the present invention.

A ferrite-ceramic composite powder consisting of fine particles of a ceramic material having high-purity crystals of a ferrite firmly bonded to the surface thereof is obtained by steps which will be described below.

First, at least one magnet having a strong magnetic force is placed in a vessel containing an aqueous solution of ferric chloride having a concentration of about 5% to 35% to establish a magnetic field. Then, many pieces of iron, for example, many pellets of iron having a grain size of about 0.1 mm to 4 mm are immersed in the aqueous solution of ferric chloride, and the solution is thoroughly agitated. Then, the solution is filtered to obtain an aqueous solution of a complex salt.

In the above steps, the aqueous solution of ferric chloride is brought into contact with the magnetized iron pellets in the vessel. Therefore, many cathodes and anodes are formed as a result of the electrolytic ion exchange, and hydrogen ions attracted to the cathodes are discharged as hydrogen gas. Thus, the complex salt solution contains stabilized anions and cations.

An aqueous solution of ferric chloride having a concentration of about 5% to 35% and containing fine particles of a ceramic material having a particle size distribution of about $0.05\mu$ to several mm, preferably, $0.05\mu$ to $20\mu$, is separately prepared. The complex salt solution is mixed with this ferric chloride solution in a proportion of about 30% to 50% of the total volume. The mixture is thoroughly agitated to provide a composite aqueous solution. This composite aqueous solution is acidic and contains $Cl^-$ ions.

Then, when an aqueous solution of caustic soda having a concentration of about 30% is mixed with the composite aqueous solution containing the fine ceramic particles, dark brown crystals of a ferrite are substantially uniformly deposited on the surface of the fine ceramic particles. The remainder is dilute salt water.

The ferrite-ceramic composite particles are then allowed to precipitate, and the supernatant portion of the solution is discarded. Alternatively, water is separated from the solution by centrifugal separation to leave the precipitate. Then, water is added to the precipitate to wash away the salt. Thereafter, the water remaining still in the precipitate is separated by evaporation, and the precipitate is dried to provide the ferrite-ceramic composite particles in which the ferrite crystals of high purity are deposited on the surface of the fine ceramic particles.

In the ferrite-ceramic composite particles thus manufactured, the ferrite ($Fe_3O_4$) is substantially uniformly deposited on the surface of each of the fine ceramic particles. The size distribution of the composite particles is about $0.1\mu$ to $25\mu$ when the original particle size of the fine ceramic particles is about $0.05\mu$ to $20\mu$.

In the ferrite-ceramic composite powder described above, the ferrite makes a plating-like ionic bond to the surface of the fine ceramic particles, and the bond is so strong that the ferrite would not be stripped off even by impartation of mechanical friction or impact.

The above description has referred to the use of fine particles of zircon ($ZrSiO_4$) by way of example. However, it is apparent that the ceramic material preferably used in the present invention is in no way limited to the zircon, and other fine ceramic particles preferably used in the present invention include those of oxides containing a metallic element or a semimetallic element, such as, zirconia ($ZrO_2$), silicon dioxide ($SiO_2$), alumina ($Al_2O_3$), cobalt oxide, titanium oxide, barium oxide and boron oxide. Also, fine particles and compounds such as those of nitrides including silicon nitride, those of carbides including silicon carbide and those of various mixtures of the aforementioned materials may be used.

Also, as a component other than iron, the ferrite may include a metallic element such as cobalt, barium or titanium or a semimetallic element.

(2) Semiconductor I

As an example, the ferrite-ceramic composite powder described in (1) (containing $Fe_3O_4$ as its ferrite component and $ZrSiO_4$ or $ZrO_2$ as its ceramic component and having a particle size distribution of about $0.1\mu$ to $3\mu$) is charged into a mold and molded under pressure. The molded block obtained after separation from the mold is placed in a high-temperature furnace the interior of which is maintained at the atmospheric pressure or a lower pressure. Heat treatment on the molded block includes the steps of raising the heating temperature at a rate of 4° C. to 10° C. per minute until a temperature level of 1,200° C. to 1,500° C. is reached, keeping the molded block at the above temperature for about 2 to 6 hours, and cooling the molded block down to the room temperature at a rate of 10° C. to 50° C. per minute, thereby turning the molded block in to a solid solution of a semiconductor. In the manner described above, a semiconductor is manufactured by a very simple method.

In the semiconductor thus manufactured, the ferrite component and the ceramic component are homogeneously mixed to form the solid solution. Therefore, the semiconductor shows an excellent heat resistivity and has a low coefficient of thermal expansion and a high mechanical rigidity.

Further, the semiconductor exhibits such an excellent functional property that its electrical resistance decreases exponentially with an increase in the temperature over a wide temperature range of from +10° C. to +1,200° C. Thus, the semiconductor is suitable for use as a material of a temperature sensor.

By way of example, the ferrite-ceramic composite powder consisting of, for example, 40% by weight of $Fe_3O_4$ and 60% by weight of $ZrSiO_4$ was molded under pressure and was then subjected in an electric furnace to heat treatment which included raising the heating temperature at a rate of 4° C./min, keeping the temperature at 1,400° C. for 6 hours and allowing to cool down, to manufacture a semiconductor. The semiconductor was placed in an atmosphere in which the temperature was changed between +10° C. and +1,000° C., and its electrical resistance was measured. According to the result of measurement, the electrical resistance of the semiconductor changes as an exponential function of the temperature as shown by a trend curve in FIG. 1.

It will be apparent from the result of measurement that the temperature characteristic of the semiconductor according to the present invention is quite excellent as compared to that of prior art thermistors whose highest measurable temperature is generally 300° C. or lower.

Further, in a high temperature range (500° C. to 1,200° C.), the semiconductor generates an electromotive force proportional to thermal energy (cal.) applied thereto.

Figure 2:
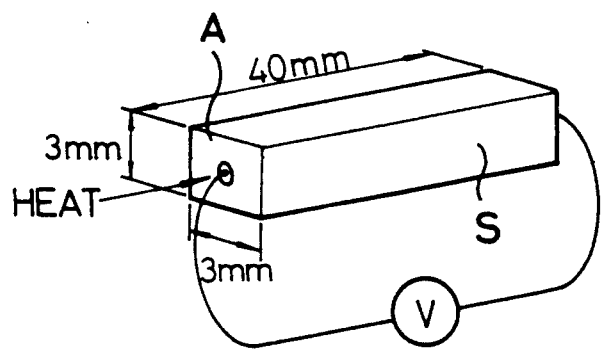
FIG. 2 is a perspective view of a semiconductor block for illustrating the temperature-electromotive characteristic of the semiconductor whose resistance value changes relative to the heating temperature as shown in FIG. 1.

By way of example, a semiconductor block S having dimensions of 3 mm×3 mm×40 mm as shown in FIG. 2 was manufactured under the same conditions as those described above. When heat of 500° C. to 1,200° C. was applied to an end face A of the semiconductor block S, and the voltage appearing across terminals $T_1$ and $T_2$ was measured. According to the result of measurement, the generated voltage changes relative to the temperature as shown by a trend curve in FIG. 3.

Further, when a low DC or AC voltage was applied across the semiconductor of the present invention, the semiconductor generated heat proportional to the applied voltage, current and frequency.

For example, when a semiconductor block having dimensions of 5 mm×5 mm×10 mm was manufactured under the same conditions as those described above, and various AC voltages having a frequency of 50 Hz and a current value of 1 A were applied across the length of the semiconductor block at the room temperature, the semiconductor block generated heat as shown in Tables 1 to 3.

TABLE 1

| | (10V, 1A) | | |
|---|---|---|---|
| Time | 1 min | 3 min | 5 min |
| Temperature | 50° C. | 80° C. | 150° C. |

TABLE 2

| | (20V, 1A) | | |
|---|---|---|---|
| Time | 30 sec | 2 min | 3 min |
| Temperature | 150° C. | 350° C. | 600° C. |

TABLE 3

| | (40V, 1A) | | |
|---|---|---|---|
| Time | 10 sec | 1 min | 2 min |
| Temperature | 150° C. | 600° C. | 900° C. |

It will be apparent from the above results of measurement that, unlike prior art resistance-type heat generators, the semiconductor of the present invention acts as a low-power heat generator having an improved efficiency of electro-thermal energy conversion.

As a comparative example, fine particles of the ferrite ($Fe_3O_4$) and zircon ($ZrSiO_4$) were merely mechanically mixed and then baked after molding under pressure. However, the individual components were not homogeneously mixed and could not form a solid solution, and the molded block could not act as an excellent heat generator.

(3) Semiconductor II

The ferrite-ceramic composite powder described in (1) (containing $Fe_3O_4$ as its ferrite component and $ZrSiO_4$ or $ZrO_2$ as its ceramic component) is molten at a high temperature by a DC-arc type high-speed plasma spray device to coat an article with the melt and, the melt is allowed to cool down to form a solid solution of a semiconductor coating the article.

The semiconductor thus formed on the article shows functional tendencies similar to those of the semiconductor described in (2). That is, the semiconductor has a temperature-resistance characteristic, a voltage generating characteristic and a heat generating characteristic similar to those of the semiconductor described in (2).

By way of example, the ferrite-ceramic composite powder consisting of, for example, 40% by weight of $Fe_2O_3$ and 60% by weight of $ZrO_2$ and having a particle size distribution of about 0.1μ to 10μ was molten at a high temperature by a DC-arc type high-speed plasma spray device using argon (Ar) gas and hydrogen ($H_2$) gas and, the melt was sprayed onto a plate of aluminum at a speed of about 400 m/sec. Then, when the melt was rapidly cooled by air, a thin film of a semiconductor having a thickness of about 150 μm and in the form of a homogeneous solid solution of the ferrite and ceramic components could be formed on the aluminum plate.

The semiconductor thus formed on the aluminum plate was placed in an atmosphere where the temperature changes between +10° C. and +1,000° C., and its electrical resistance was measured. According to the result of measurement, the semiconductor shows a tendency similar to that of the semiconductor described in (2) in its temperature characteristic. In a high temperature range (500° C. to 1,200° C.), the semiconductor generates an electromotive force proportional to thermal energy (cal.) applied thereto. Further, when a low DC or AC voltage is applied across the semiconductor, the semiconductor generates heat proportional to the applied voltage, current and frequency.

The material of the article on which the semiconductor is formed, is in no way limited to aluminum. It is apparent that the material may be any one of noncombustible materials including metals, ceramics and fabrics of any suitable shape.

It will be apparent from the above description that the semiconductor according to the present invention is a multi-functional one which is novel over prior art ones. By suitably changing the ferrite-ceramic composition ratio, heating conditions and other factors, or by adding other metal component to the ferrite component, or by using a ceramic material containing various components other than zircon ($ZrSiO_4$) or zirconia ($ZrO_2$), the semiconductor can find a variety of industrial applications. For example, not only N-type or P-type semiconductors can be produced, but also the semiconductor can be used as a material of industrial measuring instruments of magnetic type, dielectric type, piezoelectric type, pyroelectric type, etc. and also as a material of electronic members.

The high-temperature furnace used for the manufacture of the semiconductor may be any one of a vacuum furnace, a reduction furnace, an open furnace, a plasma furnace, etc.

(4) Sintered Composite

For the manufacture of a sintered composite, ferrite-ceramic (zircon) composite particles are mixed under agitation with particles of a metal such as iron and/or fine particles of a ceramic material such as zircon, and the mixture to which water or a binder is added is kneaded to prepare a sludge.

This sludge is charged into a mold to which vibration is imparted, and the sludge charged into the mold is heated to vaporize the water. Then, pressure is applied by a pressure plate to the sludge in the vibrating mold and, after heating the sludge again, the sludge is cooled and separated from the mold to obtain a molded block. When water remains still in the molded block, the molded block is dried and then baked in a high-temperature furnace at the atmospheric pressure or a lower pressure. As a result, the fine ceramic particles and/or the metal particles are integrally homogeneously compounded with the ferrite-ceramic composite particles to provide a sintered material.

In the sintered material thus manufactured, the fine ceramic particles and/or the metal particles are homogeneously and dispersedly mixed and sintered with the ferrite-ceramic composite particles. Therefore, the sintered composite has various advantages in that it is wear resistive, heat resistive and corrosion resistive, its hardness is high, its coefficient of thermal expansion is low, it is heat insulating, and it shows satisfactory magnetic characteristics.

I claim:

1. A ferrite-ceramic material consisting essentially of a homogeneous solid solution of a precipitated ferrite and a ceramic prepared by melting and cooling ferrite-ceramic composite particles having a ceramic particle with a surface film formed of a precipitated crystalline ferrite reacted and precipitated in a reduction reaction of complex ferrite ions.

2. The material according to claim 1 wherein said ceramic particles are from the group consisting essentially of zircon, zirconia, silicon dioxide, alumina, cobalt oxide, titanium oxide, barium oxide, boron oxide, an oxide, a nitride and a carbide of a metallic element or a semi-metallic element.

3. The material according to claim 1 further comprising complex metal or semi-metal ions, which are reacted and precipitated with the complex ferrite ions to form the surface film.

4. The material according to claim 1 wherein said ferrite-ceramic composite powder is melted by a high-speed plasma device.

5. A homogeneous solid solution of a ferrite ceramic material produced by preparing ferrite-ceramic composite particles which comprise fine particles of a first ceramic having firmly deposited crystals of an oxide formed by a reduction reaction of complex ferrite ions; mixing said ferrite-ceramic composite particles with fine particles of a second ceramic and particles of a metal; and sintering the mixture.

6. A material according to claim 5 wherein said first and second ceramic particles are from the group consisting essentially of zircon, zirconia, silicon dioxide, alumina, cobalt oxide, titanium oxide, barium oxide, boron oxide, an oxide, a nitride and a carbide of a metallic element or a semi-metallic element.

7. The material according to claim 5 further comprising complex metal or semi-metal ions, which are reacted and precipitated with the complex ferrite ions to form the firmly deposited crystals.

8. The material according to claim 5 wherein said ferrite-ceramic composite powder is melted by a high-speed plasma device.

* * * * *